S. M. BOLLMAN.
HAY OR GRAIN CAP.
No. 181,518.  Patented Aug. 29, 1876.
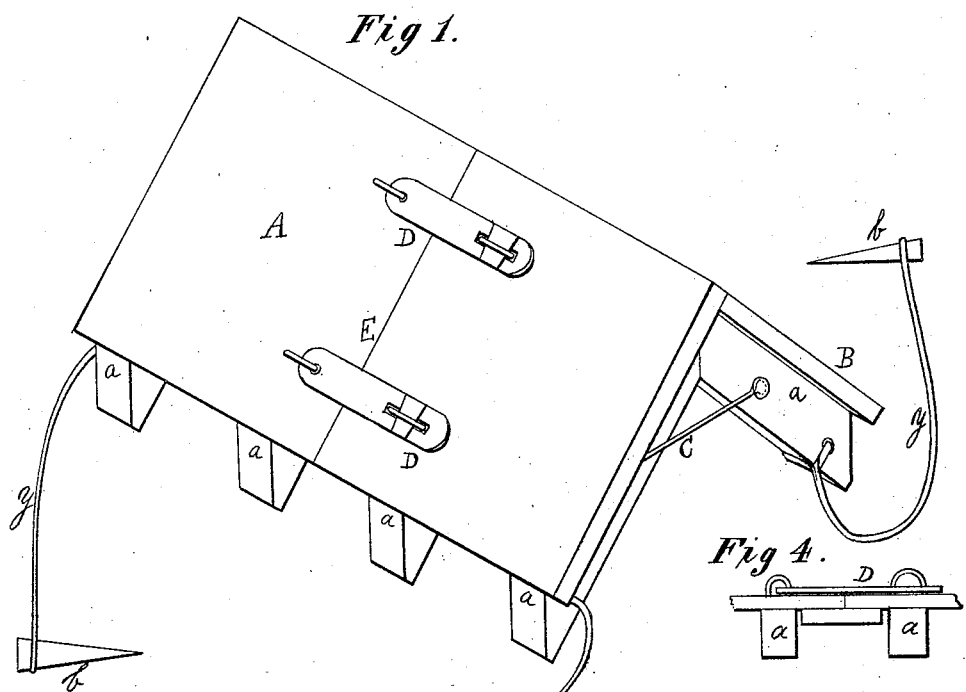
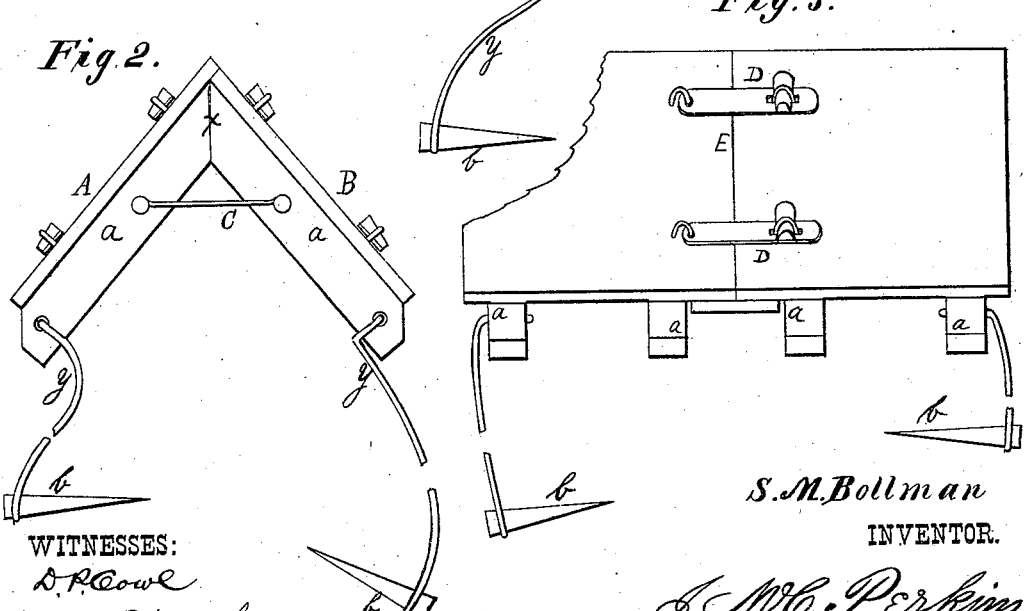
WITNESSES:
D. P. Cowl
Jno. P. Jacobs
S. M. Bollman
INVENTOR.
J. McC. Perkins
ATTORNEY.

UNITED STATES PATENT OFFICE.

SAMUEL M. BOLLMAN, OF PULASKI, IOWA.

IMPROVEMENT IN HAY OR GRAIN CAPS.

Specification forming part of Letters Patent No. 181,518, dated August 29, 1876; application filed April 4, 1876.

*To all whom it may concern:*

Be it known that I, SAMUEL M. BOLLMAN, of Pulaski, in the county of Davis and State of Iowa, have invented certain new and useful Improvements in Hay and Grain Covers; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claim.

The object of my invention is to furnish a portable roof or cover for the protection of hay or grain stacked in the field. Instead of cloth or any analogous substance, I have used wood, which has many advantages over cloth. No water can penetrate the wood, and, by its rigid form, it allows air-chambers to be formed over the hay or grain, and thus allows a proper ventilation. It is cheaper and will last longer than the usual tent-cloth.

It consists of an inclined roof of two sides, fastened together by rigid hasps placed beneath the ridge-pole. Each of these two sides can be doubled over on itself, and thus is rendered portable.

Figure 1 is a perspective view of my invention. Fig. 2 is an end view. Fig. 3 is a side view; and Fig. 4 is a detail view, showing a section of the roof where the outside hasps connect together the two parts of each side of the roof.

A represents one side of the roof, and B the other side. C is the rigid hasp, which connects and firmly holds the two sides of the roof at the mitered union shown by the line X. D D are the outside hasps, which hold the two parts of each roof-side at the line E. *a a* are the scantlings, to which each roof-side is nailed, and are mitered at the upper or highest end. *b b* are the pins, to which the cords Y Y are fastened at one end, and to the outer scantling *a a* at the other end.

When the roof is placed on the top of the hay or grain, the pins *b b* are driven into the ground at such a distance from the hay-stack as to make the ropes Y Y rigid, and thus the rigid ropes keep the roof in position.

Having now described my invention, what I claim as new, and desire to secure by Letters Patent, is—

In a hay or grain cover, the side roofs A and B, each divided at its center, and fastened together by a hasp and pin, in combination with the rigid hasps C C, the cords Y Y, and the pins *b b*, substantially as described, and for the purposes set forth.

In testimony that I claim the foregoing I have hereunto set my hand this 24th day of February, 1876.

SAMUEL MARION BOLLMAN.

Witnesses:
T. MURPHEY,
J. E. HASKETT.